United States Patent
Gneuss et al.

(10) Patent No.: US 12,290,975 B2
(45) Date of Patent: May 6, 2025

(54) EXTRUDER HAVING EXTRUDER SCREW WITH MULTIPLE DEGASSING ZONES AND DIAMETERS FOR THE VISCOSITY-INCREASING PROCESSING OF MELTABLE POLYMERS

(71) Applicant: Gneuss GmbH, Bad Oeynhausen (DE)

(72) Inventors: Daniel Gneuss, Charlotte, NC (US); Detlef Gneuss, Carabietta (CH); Stephan Gneuss, Bad Oeynhausen (DE)

(73) Assignee: Gneuss GmbH, Bad Oeynhausen (DE)

(*) Notice: Subject to any disclaimer, the term of this patent is extended or adjusted under 35 U.S.C. 154(b) by 664 days.

(21) Appl. No.: 17/576,605

(22) Filed: Jan. 14, 2022

(65) Prior Publication Data

US 2022/0134627 A1    May 5, 2022

Related U.S. Application Data

(63) Continuation of application No. PCT/DE2020/100631, filed on Jul. 19, 2020.

(30) Foreign Application Priority Data

Jul. 18, 2019  (DE) .............. 10 2019 119 528.4
Oct. 10, 2019  (DE) .............. 10 2019 127 393.5

(51) Int. Cl.
*B29C 48/76*    (2019.01)
*B29B 7/42*    (2006.01)
(Continued)

(52) U.S. Cl.
CPC ............ *B29C 48/767* (2019.02); *B29B 7/429* (2013.01); *B29B 7/845* (2013.01); *B29C 48/52* (2019.02); *B29C 48/53* (2019.02)

(58) Field of Classification Search
CPC ..... B01F 7/00991; B29B 7/422; B29B 7/486; B29B 7/427; B29B 7/46; B29B 7/487;
(Continued)

(56) References Cited

U.S. PATENT DOCUMENTS 3,825,236 A * 7/1974 Hussmann ............ B29C 48/395
366/89
6,705,753 B2 * 3/2004 Behling ................. B29C 48/44
366/85
(Continued)

FOREIGN PATENT DOCUMENTS

DE     102013003380 B3    4/2014
DE     102017111275 A1 * 11/2018 .............. B01F 7/082
(Continued)

OTHER PUBLICATIONS

International Search Report dated Sep. 25, 2020 in corresponding application PCT/DE2020/100631.

*Primary Examiner* — Charles Cooley
(74) *Attorney, Agent, or Firm* — Muncy, Geissler, Olds & Lowe, P.C.

(57) ABSTRACT

An extruder for the viscosity-increasing preparation of meltable polymers, wherein an extruder screw with at least one helical extruder screw flight is positioned in a housing having an inner housing recess. A diameter central region has a larger outer diameter than at least one of the other diameter regions, and a conical transition is formed in each case between regions of different diameters. Two degassing zones are provided in the diameter central region, each of which has at least one associated suction opening in the housing, one degassing zone being designed in the region of the satellite screws and an additional degassing zone being designed upstream thereof in the flow direction. The thread depth of the screw threads, formed between the extruder (Continued)

screw flights is greater in both degassing zones than in at least one sealing and compression section formed therebetween.

7 Claims, 8 Drawing Sheets

(51) Int. Cl.
    *B29B 7/84*         (2006.01)
    *B29C 48/52*      (2019.01)
    *B29C 48/53*      (2019.01)

(58) Field of Classification Search
CPC ......... B29B 7/823; B29B 7/726; B29B 7/826; B29B 7/485; B29B 7/489; B29B 7/7495; B29B 7/845; B29B 7/429; B29B 7/421; B29B 7/482; B29B 7/428; B29B 7/86; B29C 48/515; B29C 48/44; B29C 48/365; B29C 48/255; B29C 48/2565; B29C 48/455; B29C 48/387; B29C 48/507; B29C 48/85; B29C 48/84; B29C 48/285; B29C 48/425; B29C 48/435; B29C 48/2561; B29C 48/39; B29C 48/29; B29C 48/43; B29C 48/766; B29C 48/25684; B29C 48/288; B29C 48/655; B29C 48/683; B29C 48/688; B29C 48/76; B29C 48/83; B29C 48/765; B29C 48/767; B29C 48/832; B29C 48/834; B29C 48/875; B29C 48/52; B29C 48/53; B29C 48/67

See application file for complete search history.

(56) References Cited

U.S. PATENT DOCUMENTS

| | | | |
|---|---|---|---|
| 7,513,677 B2 | 4/2009 | Gneuss et al. | |
| 9,061,442 B2 | 6/2015 | Gneuss et al. | |
| 11,141,903 B2 | 10/2021 | Gneuss et al. | |
| 12,128,599 B2* | 10/2024 | Gneuss | B29B 7/489 |
| 2003/0012077 A1* | 1/2003 | Behling | B29B 7/60 |
| | | | 366/85 |
| 2021/0283814 A1 | 9/2021 | Gneuss et al. | |
| 2022/0134626 A1* | 5/2022 | Gneuss | B29B 7/429 |
| | | | 366/75 |
| 2022/0134627 A1* | 5/2022 | Gneuss | B29C 48/52 |
| | | | 366/75 |
| 2023/0278273 A1* | 9/2023 | Gneuss | B29B 7/489 |
| | | | 425/376.1 |
| 2023/0286200 A1* | 9/2023 | Gneuss | B29C 48/435 |

FOREIGN PATENT DOCUMENTS

| | | |
|---|---|---|
| DE | 102018128884 A1 | 5/2020 |
| EP | 0588008 A1 | 3/1994 |
| EP | 1434680 B1 | 7/2006 |
| EP | 3221120 B2 | 1/2020 |
| WO | WO2020108705 A1 | 6/2020 |

* cited by examiner

EXTRUDER HAVING EXTRUDER SCREW WITH MULTIPLE DEGASSING ZONES AND DIAMETERS FOR THE VISCOSITY-INCREASING PROCESSING OF MELTABLE POLYMERS

This nonprovisional application is a continuation of International Application No. PCT/DE2020/100631, which was filed on Jul. 19, 2020, and which claims priority to German Patent Application No. 10 2019 119 528.4, which was filed in Germany on Jul. 18, 2019, and to German Patent Application No. 10 2019 127 393.5, which was filed in Germany on Oct. 10, 2019, and which are all herein incorporated by reference.

BACKGROUND OF THE INVENTION

Field of the Invention

The present invention relates to an extruder for viscosity-increasing processing of meltable polymers.

Description of the Background Art

In plastics technology, extruders are used for plasticizing and processing polymers. If the objective is mere plasticizing, many designs are available as monorotors with one extruder screw or as double rotors with two extruder screws, whereby the special geometry of the extruder screws results in plastic being drawn in at one end in the form of solid particles, which are melted in the course of the screw and ejected in liquid form at the end. In many applications, homogenization and degassing are also carried out, for example to remove moisture contained in the solids. A disadvantage here is often that the strong shearing of the melt in the extruder leads to a reduction in the molecular chain lengths of the polymer and thus to a reduction in its viscosity. These effects occur in particular with highly viscous polymers with correspondingly long molecular structures, which are susceptible to mechanical influences. For certain applications, however, the viscosity must not drop too much during plasticization in the extruder, provided that a certain viscosity of the molten polymer is required for the further processing process. This applies, for example, to the recycling of hydrolyzable polycondensates such as polyester (PET), and here in particular in connection with demanding downstream processing operations such as the production of textile plastic fibers.

An extruder with a multi-rotation system is known from EP 1 434 680 B1, which corresponds to US 2005/0047267, which is incorporated herein by reference, for plasticizing and, above all, for processing certain polymers with a simultaneous increase in viscosity. This so-called MRS extruder has an extruder screw with a multi-screw extruder section, in which several driven satellite screws are arranged around the main screw. They rotate with the extruder screw as a unit and at the same time they rotate around their own axis. In the multi-screw extruder section, there is a high degree of mixing and enlargement of the surface area, so that a gas extraction system arranged in this area on the extruder housing is particularly effective. Due to the extraction of a large part of the moisture contained in the polymer, a significant chain elongation and thus an increase in intrinsic viscosity can be achieved in polycondensates. Since impurities are separated at the same time, an MRS extruder is particularly suitable for recycling polyester (PET) and enables high-purity PET to be obtained directly from recycled material in continuous operation, which can be used for new beverage and food packaging without further post-treatment.

However, the basically proven principle of the described processing of PET in the MRS extruder requires a very high vacuum, i.e. a very low residual pressure in the area of the degassing zone of preferably less than 5 mbar, so that the volatile components can be almost completely eliminated and the molecular chain extension of the polyester can be maximized accordingly. Only certain types of vacuum pumps can be considered for generating such a low vacuum. There is also a conflict of objectives in that large volumes of gaseous or vaporous components have to be extracted, which requires large venting cross sections, but on the other hand a high vacuum is much easier and cheaper to achieve in small line cross sections. Here, therefore, it is always necessary to weigh up optimum material properties as a result of the processing and an economical mode of operation with reference to the degassing equipment. Another problem is that high-vacuum extraction equipment and the associated lines are more susceptible to sticking due to condensates and sublimates that separate from the extracted residual materials. This applies in particular to highly contaminated PET residues such as bottle flakes, which not only contain moisture but also, for example, adhesive residues from labels and the like.

SUMMARY OF THE INVENTION

It is therefore an object of the present invention to make it possible to process polymer melt, in particular PET, under high vacuum using vacuum equipment that can be operated economically.

Surprisingly, a concept that further develops the MRS extruder proven for PET processing leads to success by providing two degassing zones that are designed separately from each other and operated separately with separate suction devices.

First, the solution of the invention is based on a known MRS extruder with several satellite screws. These are rotatably mounted on the outside of the extruder screw and have a toothing which engages in an internal toothing of the housing bore. This results in a speed of the satellite screws that differs from the speed of the driven extruder screw shaft, namely a speed that is significantly increased under the usual geometric conditions. The increased rotational speed is also important in the concept of the invention because it achieves a strong loosening of the melt guided through the effective range of the satellite screws, which in turn favors degassing.

According to the invention, a partial diameter increase of the extruder screw in a degassing zone is provided to increase the peripheral speed in the vacuum suction zone. However, the viscosity increase achievable with the extruder according to the invention and a more economical mode of operation are essentially due to the fact that the degassing options are doubled.

The one degassing zone is usually located in the area of the set of rotating satellite screws. The satellite screws cause a very substantial increase in the surface area of the polymer conveyed through this extruder section, so that previously trapped volatile components are released by mechanical action and can be extracted. This degassing zone is located downstream of another degassing zone, which is additionally provided by the invention.

Essential to the invention is this upstream degassing zone, which acts as a pre-degassing zone and already extracts the majority of water and other volatile components, so that only residues of the extractable substances reach the second degassing zone at all, i.e. a quasi post-degassing zone. As a result, a high vacuum can be effective in the second degassing zone, which improves the quality of the processed polymer. At the same time, the high vacuum can be used economically, because only small volumes have to be extracted and, accordingly, the design and operation of the extraction device can be made more cost-effective. A pressure of less than/equal to 5 mbar is considered as a high vacuum for an extruder according to the invention. Such a low pressure can be generated, for example, by means of a Roots pump.

For pre-degassing, on the other hand, a simple suction device such as a water ring pump is sufficient, which is operated for pre-degassing in the extruder according to the invention at a pressure of less than approx. 10 mbar to 100 mbar and can suck off larger volumes. A high vacuum is not required at this point.

The residual pressure in the pre-degassing zone should be at least a factor of 5 greater than the residual pressure in the post-degassing zone. This ratio has been found to be advantageous for economical operation.

In order to support the described effects of pre- and post-degassing, the extruder screw shaft is designed in such a way that spontaneous evaporation of most volatile constituents, such as water in particular, takes place in the first degassing zone and that these substances can escape from the degassing zone simply due to the vapor pressure. The geometry of the extruder screw shaft described below contributes significantly to this. The invention is thus based on considerably more than just a second suction device to be connected to the housing.

It is important to achieve a largely gas-tight separation of the two adjacent degassing zones. This is only possible due to a special geometry of the extruder screw shaft. In the degassing zones, this shaft has deeply cut screw channels between the screw flights. This means that, while the outer diameter of the screw flight remains unchanged, the diameter of the extruder screw shaft core is reduced there. The screw flight thus has a cylindrical envelope that is matched to the diameter of the barrel bore throughout all degassing zones. While the outer diameter of the extruder screw shaft is constant, however, the inner diameter varies.

A compression and sealing zone is formed between the degassing zones, which can be significantly shorter than the degassing zones. At this point, the diameter of the extruder screw shaft core is significantly larger—still with a constant outer diameter of the screw flight—so that the flight depth of the main screw is reduced there. It is reduced to such an extent that compression of the conveyed polymer melt occurs. The compression in turn leads to a self-sealing effect, i.e., during operation, when the intended volume flow is conveyed, the liquid melt itself forms a closed sealing ring of liquid polymer melt between the diameter of the extruder screw shaft core and the inner wall of the housing. Since a large proportion of the volatile constituents has already escaped or has been extracted from the melt passing through this point, the viscosity of the melt in the sealing zone is also already increased again compared with the inlet area, which ensures a good sealing effect.

In any case, a preparation process using the extruder according to the invention is operated in such a way that the melt in the dense zone has such a viscosity that it cannot be sucked out of the compression zone by either of the suction devices connected to the degassing zones adjacent on both sides.

In order to refer to the geometry of the extruder screw, the diameters are designated as follows:
  $D1$ in a feeding/metering zone
  $D3$ in a discharge zone and
  $D2$ in the intervening area, also called the middle zone, in which the degassing zones are located.

The outer diameter $D2$ of the extruder screw, which is defined by the outer edge of the extruder screw flight on the extruder screw shaft, is significantly increased compared to the preceding feed and metering zone as well as the subsequent discharge zone and is at least 1.2 to 2.0 times the diameter $D1$ there. It is preferably largely constant over the length, resulting in a cylindrical envelope. This makes it easy to produce the associated bore in the housing, and small axial displacements between the extruder screw and housing are possible. Only in the transition areas to the sections of the extruder screw before and after the center zone does a conical shape preferably result.

The outer diameter of the extruder screw corrugation core, on the other hand, varies greatly in the two degassing zones: while it is also large in an upstream initial region, resulting in a shallow flight depth between the parallel sections of the extruder screw flight, it is much smaller in the downstream degassing region, resulting in deep screw flights.

The suction openings in the housing are located where the gear depth is large. They can extend up to the diameter step of the shaft core between the start and end areas.

The melt, which has already been plasticized in the first part of the extruder screw, is strongly compressed in the initial area of the first degassing zone, where the free volume in the screw flights formed between the screw flight, shaft core and housing bore is low.

In the end region of the first degassing zone, however, the volume is much larger and cannot be nearly filled by the melt supplied. At the diameter step of the corrugated core, therefore, an abrupt expansion of the melt into the free volume takes place. The melt stream ruptures and leads to a considerable increase in the surface area of the melt, which enables the volatile substances to be extracted from the melt. In the first degassing zone, in which the melt is still loaded with all volatile substances, the water contained, for example, evaporates abruptly.

This is followed by another compression. Gas components still trapped in the melt are pressed out of the melt at this point, so that it is favorable to bring the first degassing zone right up to the sealing and compression section.

In the second degassing zone, the surface enlargement is caused by the described geometry of the screw on the one hand and on the other hand by the rotating satellite screw shafts, so that the substances remaining after passing through the first degassing zone are also released.

If the diameter $D2 \geq 1.5 \times D1$ is selected, it is ensured that in the vacuum chamber of the extruder formed by the degassing port an interaction between melt and vacuum is achieved over a larger area.

It is advisable for the length of the screw in the degassing zone to be $2 \times D2$. This results in the largest possible area that can be degassed via the degassing connection. This results in the largest possible area that can be degassed via the degassing port.

If, for example, the pitch of the screw flight in the entry zone and in the degassing zone are essentially the same, it is advantageous if at least one further screw flight with essentially the same pitch is provided in the degassing zone of the screw between the screw flight.

Due to the increase in diameter in the end region of the degassing zone of the extruder, the screw land would be considerably farther apart than in the feed/metering zone or discharge zone of the screw, with the same pitch as in the feed and metering zone. By providing at least one second screw flight located inside the first screw flight, there are more shear locations along the length of the screw in the devolatilization zone between the barrel the helixes that can perform churning and feeding so that the surface area of the melt in the devolatilization zone is further increased.

However, it is also possible that, for example, the pitch of the screw in the feed/metering zone and in the discharge zone is essentially the same, but that the pitch of the screw helix in the degassing zone is greater than there.

As a result, the screw flight grows closer together in the degassing zone of the extruder. This can also result in more churning and feeding of the melt, which increases the surface area of the melt that comes into contact with the vacuum.

It is advantageous if the flight depth of the screw flight in the degassing zone is at least 10% of the diameter D of 2 the extruder screw in the degassing zone.

In particular, the gangway depth h in the pre-degassing zone should be tuned according to the following relationship:

$$h(\text{pre-degassing}) = Z \cdot \frac{D1}{D2^2} \cdot \frac{t(\text{feed zone})}{t(\text{pre-degassing})} \cdot h(\text{feed zone})$$

where D1, D2 are the diameters defined above, h are the channel depths and t are the pitches in the respective sections. A factor Z>8 has proven to be advantageous, in particular Z>4.

Each of these measures ensures that the screw flights formed between the screw flights on the outside of the extruder screw shaft are not fully filled with melt during operation of the extruder. The melt has the greatest height at the flank of the screw flights and drops towards the bottom in the middle of the flight, and/or the melt can be distributed over a greater length. In addition, the movement of the extruder screw shaft allows the melt in the screw flight to be churned. These measures also serve to ensure that a larger melt surface comes into contact with the vacuum prevailing at the degassing connections in the same time, and thus the melt can be degassed more effectively.

It can be advantageous if the extruder has an adjustable throttle or an adjustable retaining ring in the transition from the metering zone to the degassing zone, via which the shear gap can be adjusted. On the one hand, this ensures that only properly plasticized melt enters the degassing zone. On the other hand, a certain degree of sealing is achieved, which ensures that no short-circuit can occur for the negative pressure to the inlet zone.

In addition, the special geometry provides the principle of an expansion nozzle, which in the invention is brought about by the core diameter reducing abruptly in both degassing zones while the outer diameter of the web remains the same and the inner diameter of the housing bore remains constant.

The principle of the expansion nozzle in the degassing zones according to the invention entails, in addition to the mechanical influences on the melt described, a temperature influence, namely cooling. The cooling that occurs can be used in the extruder according to the invention as an additional effect in various ways.

Whereas in the MRS extruder in the prior art, internal cooling of the extruder screw shaft in the degassing zone is almost always necessary to compensate for the enormous heat input due to mechanical shear, this can be dispensed with according to the invention at least for the end region of the second degassing zone. This at least reduces the cooling power required for the entire extruder screw.

Under certain circumstances, the cooling is so severe that the melt can partially freeze. To counteract this, heating of the end area of the degassing zone can be provided. For this purpose, for example, the housing can be heated with heating bands.

Since, on the other hand, the extruder according to the invention still has a high heat input due to shear in the feed and metering zone, it is advisable to dispense with external temperature control of the extruder screw and instead to circulate a fluid for temperature control through internal channels of the screw, for which only an external pump is provided, but no external heat exchanger. The fluid is introduced into an internal screw bore at the shaft end, heats up in the feed and metering zone, possibly also in the initial area of the degassing zone, and then transfers the heat into the final area to the cooled melt guided in the deep screw flights. The discharge takes place at the other end of the extruder screw shaft. The return to the pump is external.

It is advantageous if the screw has temperature control channels which, especially in the degassing zone, e.g. in the form of peripheral channels or concentric channels, ensure fast-acting, precise adjustment of the surface temperature of the screw. Even the screw flights can be formed as channels.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
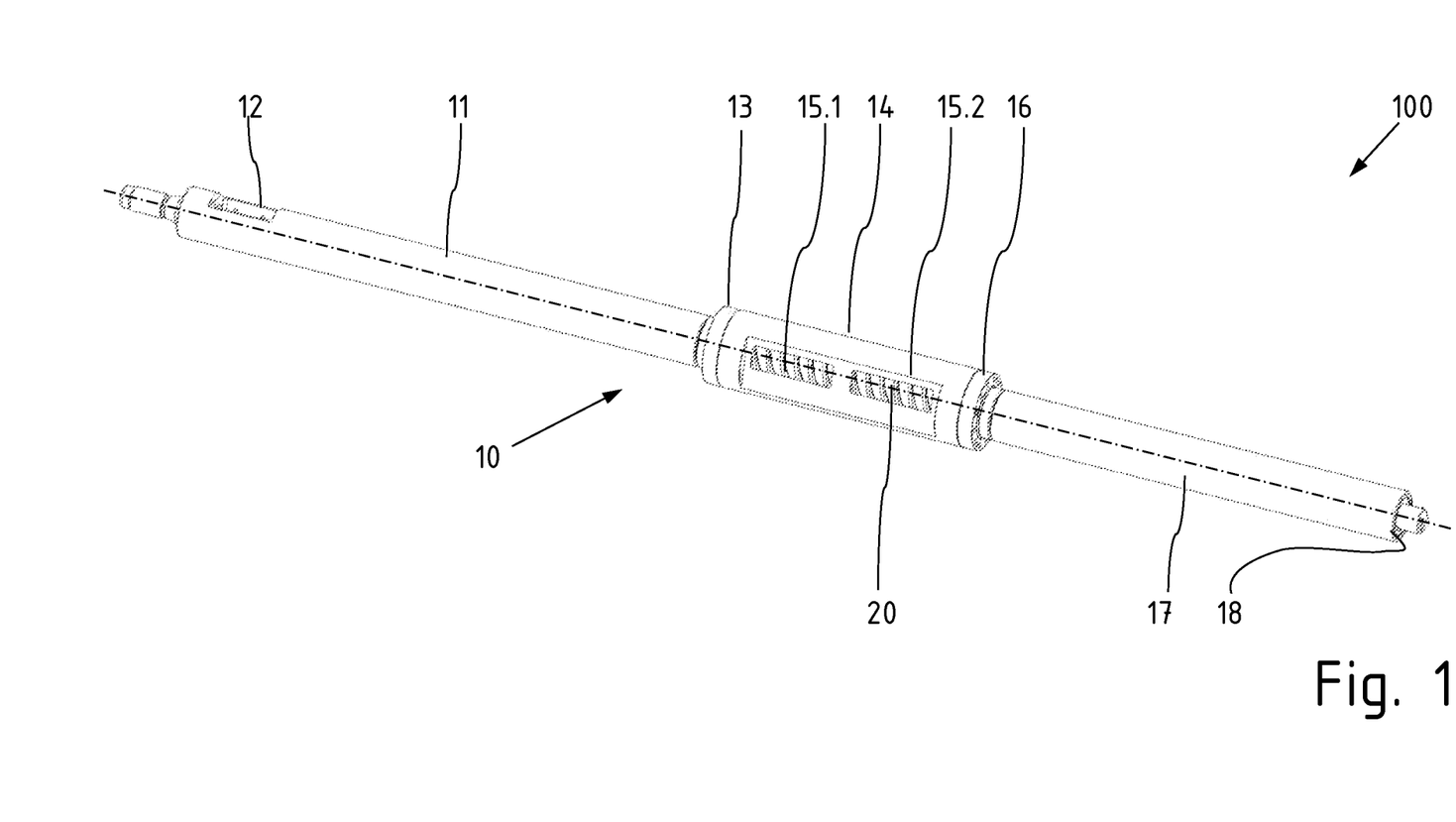
FIG. 1 is a perspective view of an extruder from the outside.

In FIG. 1, an extruder 100 according to the invention is shown in perspective view from the outside, whereby end bearing and drive elements are not shown. In particular, the housing 10 with an inner housing bore 18 in the form of a bore in which an extruder screw 20 is rotatably mounted is visible. The housing 10 has an inlet area 11 with an intake opening 12 for solid polymer particles. Connected via a connecting flange 13 is an intermediate region 14 with an enlarged diameter, which has two housing openings 15.1, 15.2, each of which extends into the inner housing bore 18. A suction device, in particular a vacuum pump, is connected to each of the housing openings 15.1, 15.2.

A further connecting flange 16 connects to an end region 17 of the housing 10, the diameter of which is again reduced, and which corresponds approximately to that of the initial region 11. At the end of the end region 17, the housing recess opens so that the processed polymer melt can be discharged from this point for further processing.

Figure 2A:
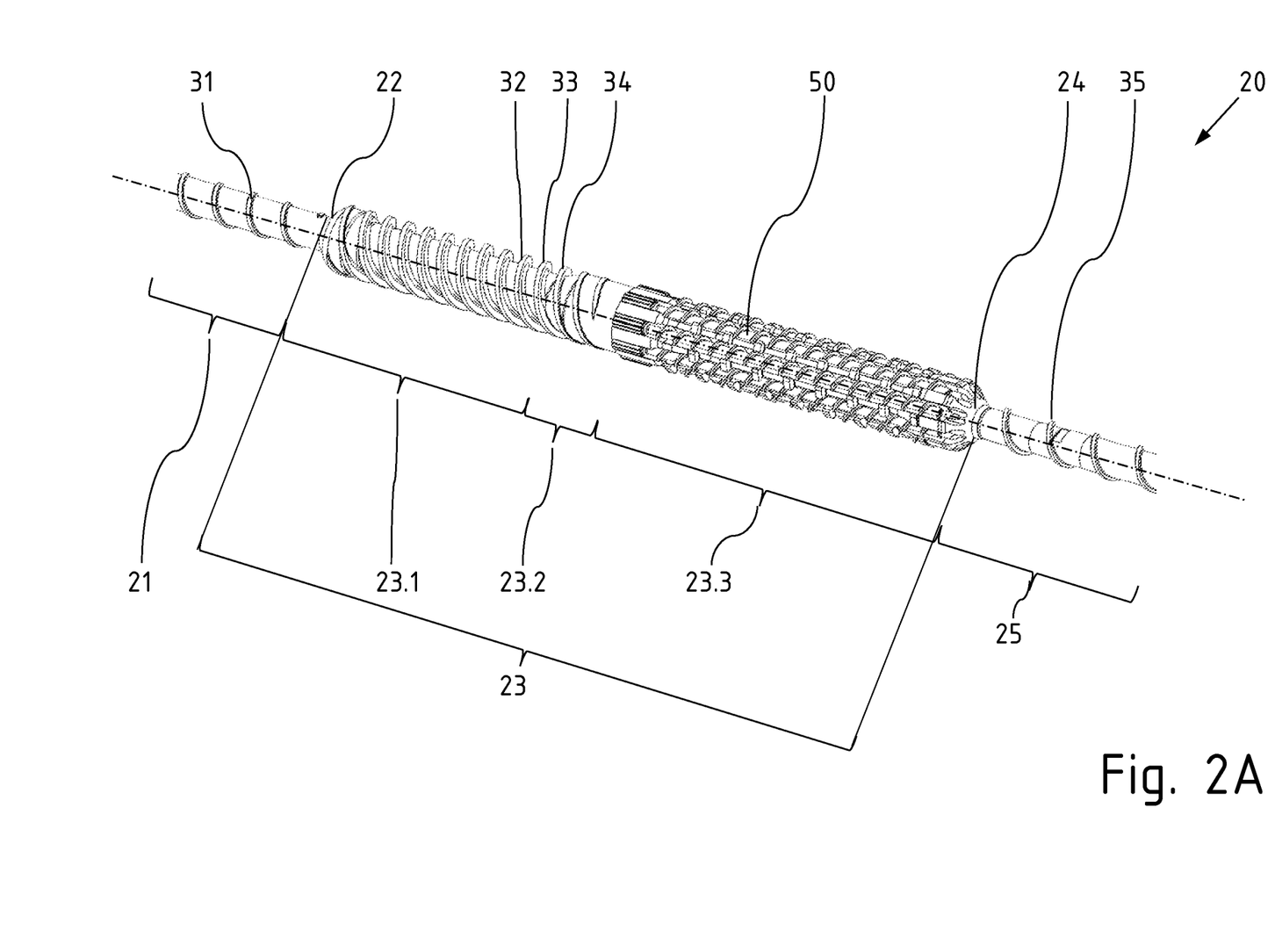
FIGS. 2A, 2B are each parts of an extruder screw in perspective view.
Figure 2B:
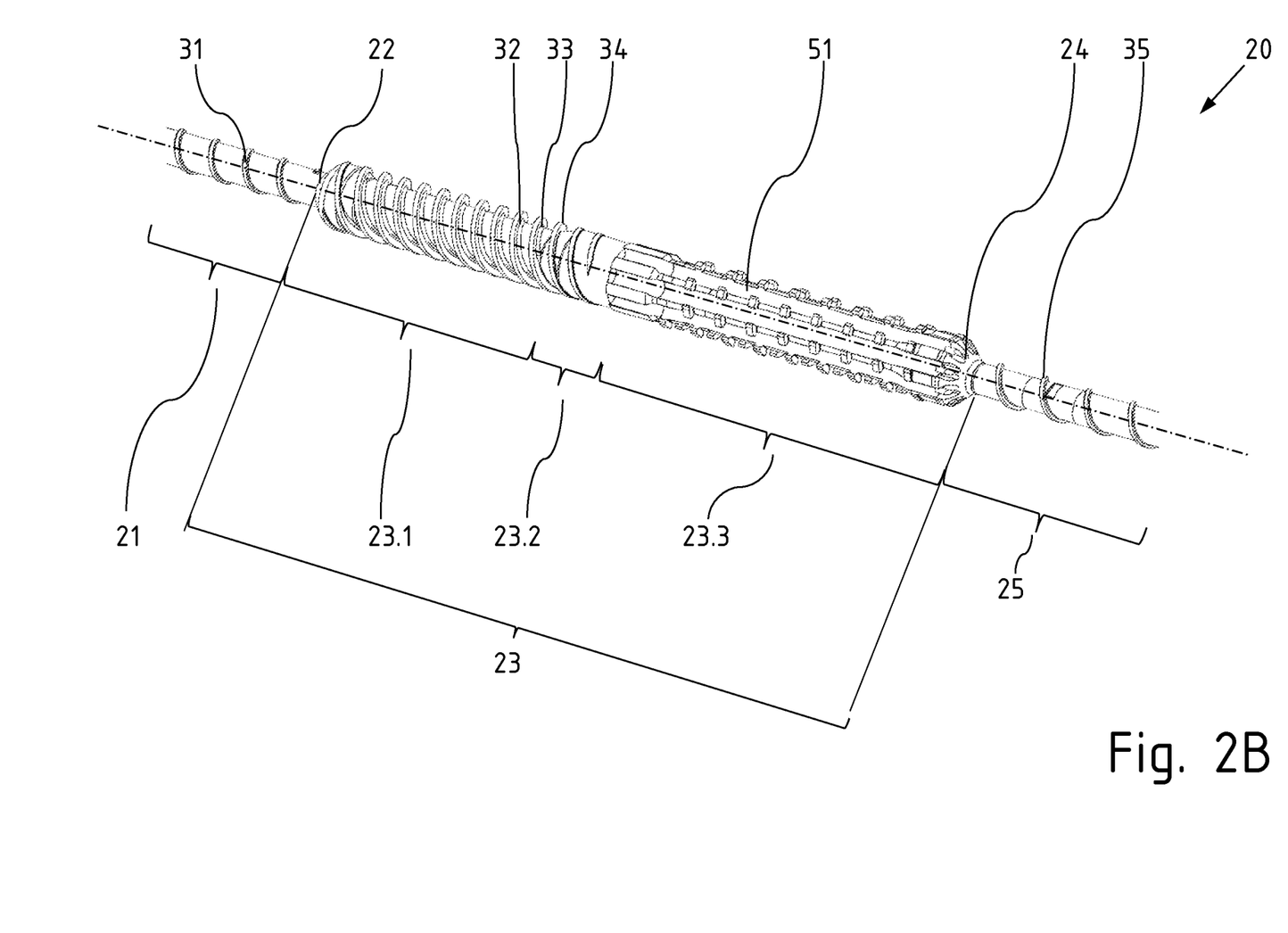

FIGS. 2A and 2B each show parts of the extruder screw 20 from the same perspective view. In FIG. 2A, the extruder screw 20 is shown with its satellite screws 50. In FIG. 2B, only their receiving grooves 51 are visible so that the view of the geometry of the extruder screw 20 remains unobstructed.

A feed and metering zone 21 has a helical extruder screw flight 31. Extruder screw 20 also has a discharge zone 25 of the same or similar diameter as the feed and metering zone 21 and also has only one extruder screw flight 35.

Between them is a degassing zone 23, which in turn is divided into a first pre-degassing zone 23.1, a sealing and compression zone 23.2 and a post-degassing zone 23.3. In the degassing zone 23, the screw shaft core, whose diameter varies along its length, is surrounded by a total of three intertwined extruder screw flights 32, 33, 34.

Figure 3:
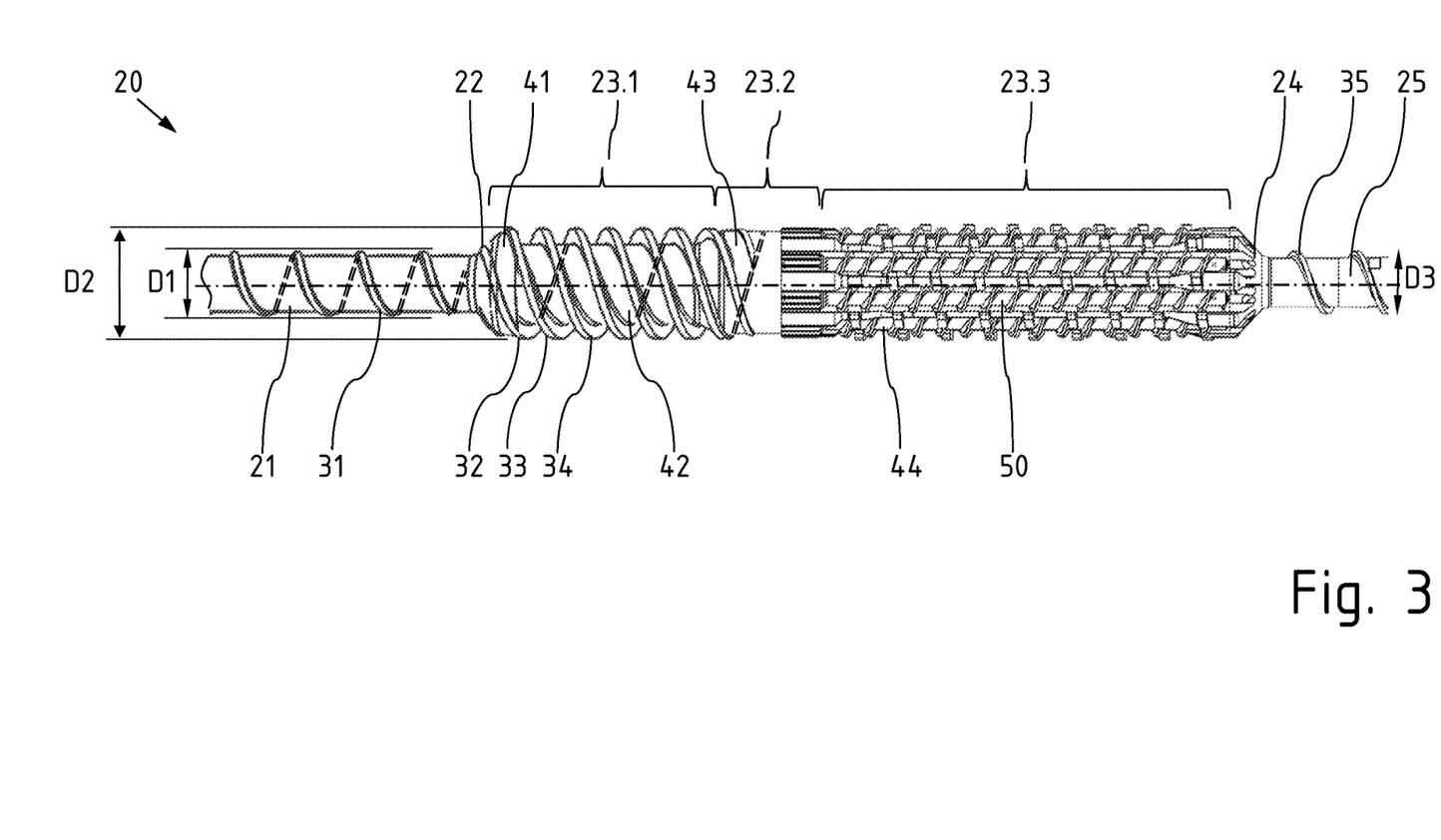
FIG. 3 is a detail of the extruder screw in side view.

In FIG. 3, the section of the extruder screw 20 essential to the invention is shown in an enlarged, lateral view, with the respective outer diameters D1, D2, D3 also indicated. Exemplary dimensions and geometrical relations are as follows: In the feed and metering zone 21, the extruder screw flight 31 has a relatively small outer diameter D1 of 110 mm, for example; In the discharge zone 25, the extruder screw flight 35 has an outer diameter D3 which is 0.8 to 1.2 times the outer diameter D1, i.e. approximately equal to D1, but may be 20% larger or smaller; and/or In the degassing zone, 23 the extruder screw flights 32, 33, 34 have a uniform outer diameter D2 which is at least 1.5 times D1, and in particular twice as large. In the example, D 2=190 mm.

The outer diameters D1, D2 and D3 thus vary only between the zones, but are constant in each case within the respective zone 21.2, 23, 25. Tapered transition zones 22, 24 are formed in between.

The shaft core diameter is largely constant both in the feed and metering zone 21 and in the discharge zone 25. Small variations in the shaft core diameter and/or the pitch of the extruder screw 20 are provided, as is usual in extrusion technology, in order to achieve homogenization and compaction and/or to influence the flow rate locally.

Immediately in the transition from the degassing zone 23 to the discharge zone 25, for example, the shaft core diameter of the discharge zone is reduced compared to the diameter in the further course, so that the melt pressure in the discharge zone 25 can be built up again after it was at approximately zero in the post-degassing zone 23.3 due to the high vacuum present there.

It is essential to the invention that the shaft core diameter is abruptly reduced twice within the degassing zone 23. At the transition from the transition zone 22 to the pre-degassing zone 23, as well as in the sealing and compression section 23.2 that follows, the shaft core diameter is large; the height of the extruder screw flights 32, 33, 34 and thus the height of the screw flights 41, 43 formed therebetween is small in relative terms.

Between these points, the shaft core diameter is significantly smaller, resulting in a greater flight depth between the screw flights. In the example given, the flight depth for screw flights 41, 43 is, for example, 4 mm, corresponding to between 10% and 20% of the outer diameter D2. The flight depth of screw flights 42, 44 in the degassing zones 23.1, 23.3 is 32 mm in the example, so that the height of screw flights 42 there has increased by a factor of 3 to 10 compared with screw flights 41 in the initial zone 23.1 or in the sealing and compression section 23.2.

The dashed double lines in FIG. 3 serve to indicate the course of the extruder screw flights along the length of the extruder screw shaft. In the feed and metering zone 21 and in the discharge zone 25, there is only one helical extruder screw flight 31, 35 in each case. In the degassing zone 23, the dashed double lines indicate the course of a first extruder screw flight 32. It can be clearly seen that these lines cross two further extruder screw flights 33, 34 in each case. Thus, a total of three intertwined extruder screw flights 32, 33, 34 are formed in the degassing zone 23.

Figure 4:
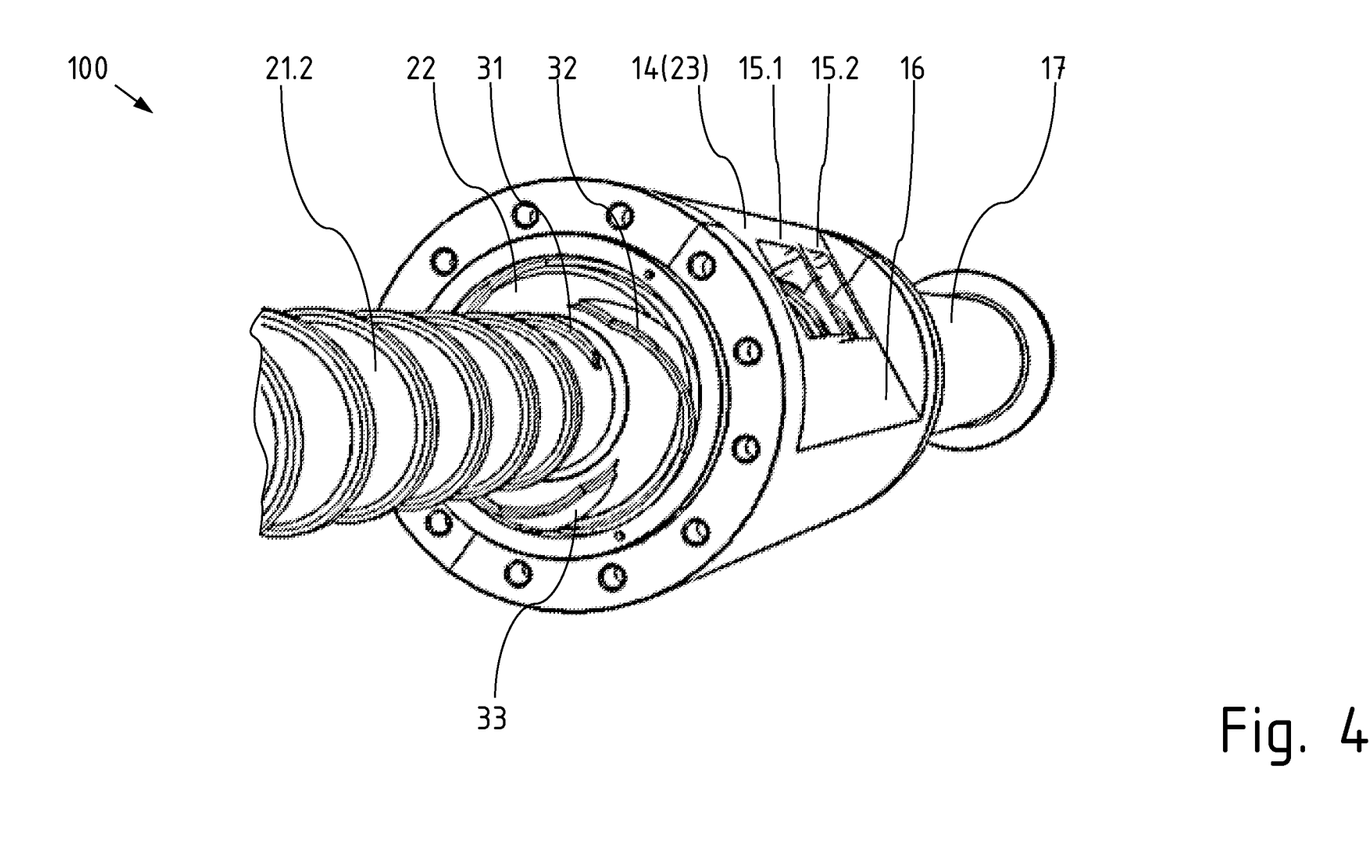
FIG. 4 is a detail of the extruder in perspective view.

FIG. 4 shows a perspective view of the transition from the feed and metering zone 21 to the degassing zone 23 within an intermediate area 14 of the housing 10. For this purpose, the housing parts 11 and 13 (see FIG. 1) are removed so that there is a clear view of the conical transition zone 22. The extruder screw flight 31 of the feed and metering zone 21 runs out in front of the transition zone 22. Already within the transition zone 22, the three extruder screw flights 32, 33, 34 of the degassing zone 23 have their beginnings, whereby in FIG. 4 only the beginnings of the extruder screw flights 32, 33 are visible. The termination of the extruder screw flight 31 before the transition zone 22 and the beginning of the three extruder screw flights 32, 33 and 34 within the transition zone 22 result in an early division of the melt stream into three partial streams.

Figure 5:
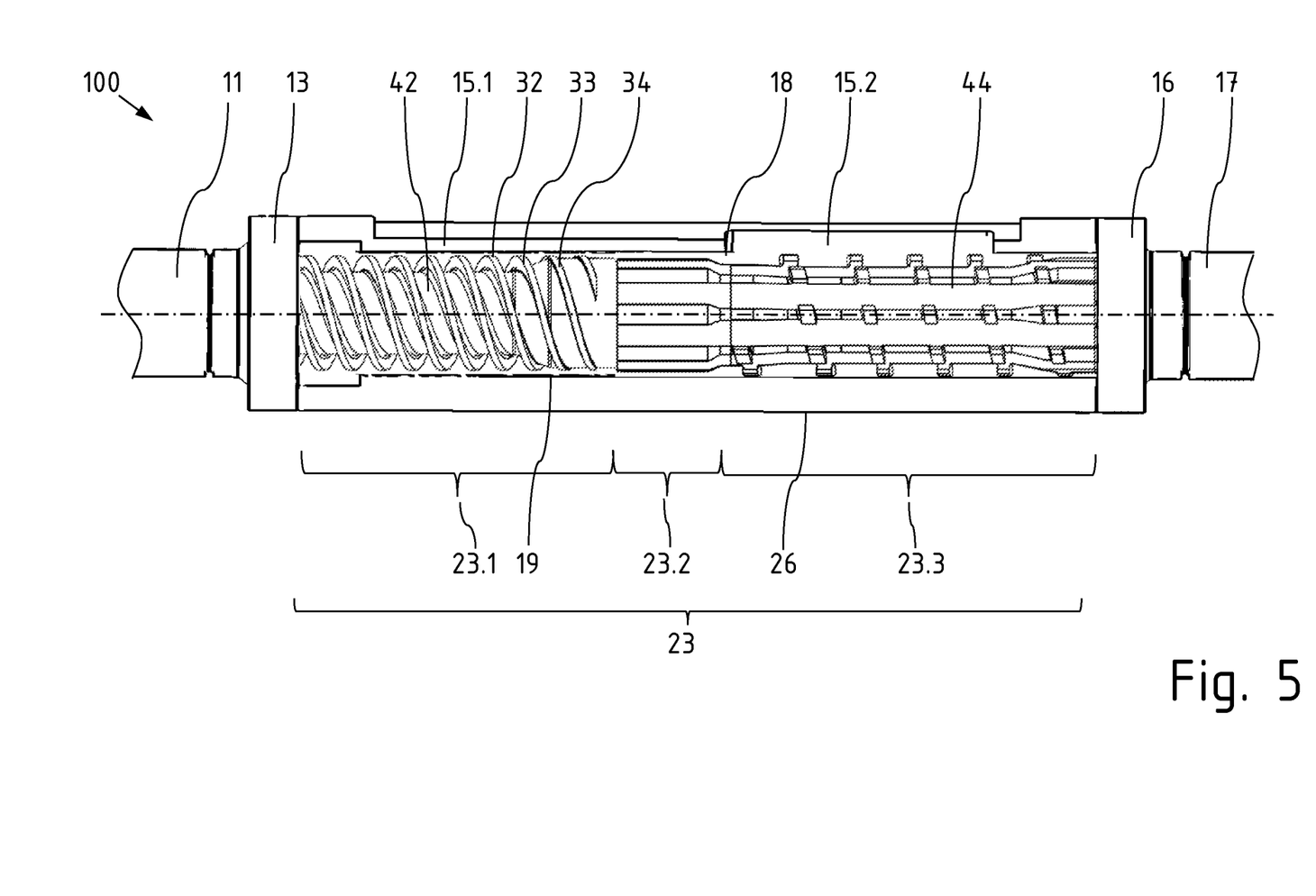
FIG. 5 is a detail of the extruder in a side, partially cut view.

FIG. 5 shows the essential part of the extruder 100 according to the invention in a partially cut view. Herein, the intermediate portion of the housing 10 is shown in section. It can be seen that the outer edges of all three extruder screw flights 32, 33, 34 end very close to the inner wall 19 of the housing bore 18. It is easy to see in FIG. 5 the course of the diameter of the extruder shaft core, which is greatly reduced in the pre-degassing zone 23.1 and then again behind the sealing and compression zone 23.2 at the beginning of the post-degassing zone 23.3. As a result, large-volume, deep-cut screw flights 42 are formed between the inner wall 19, the parallel sections of the extruder screw flights 32, 33, 34 and the extruder shaft core.

Figure 6:
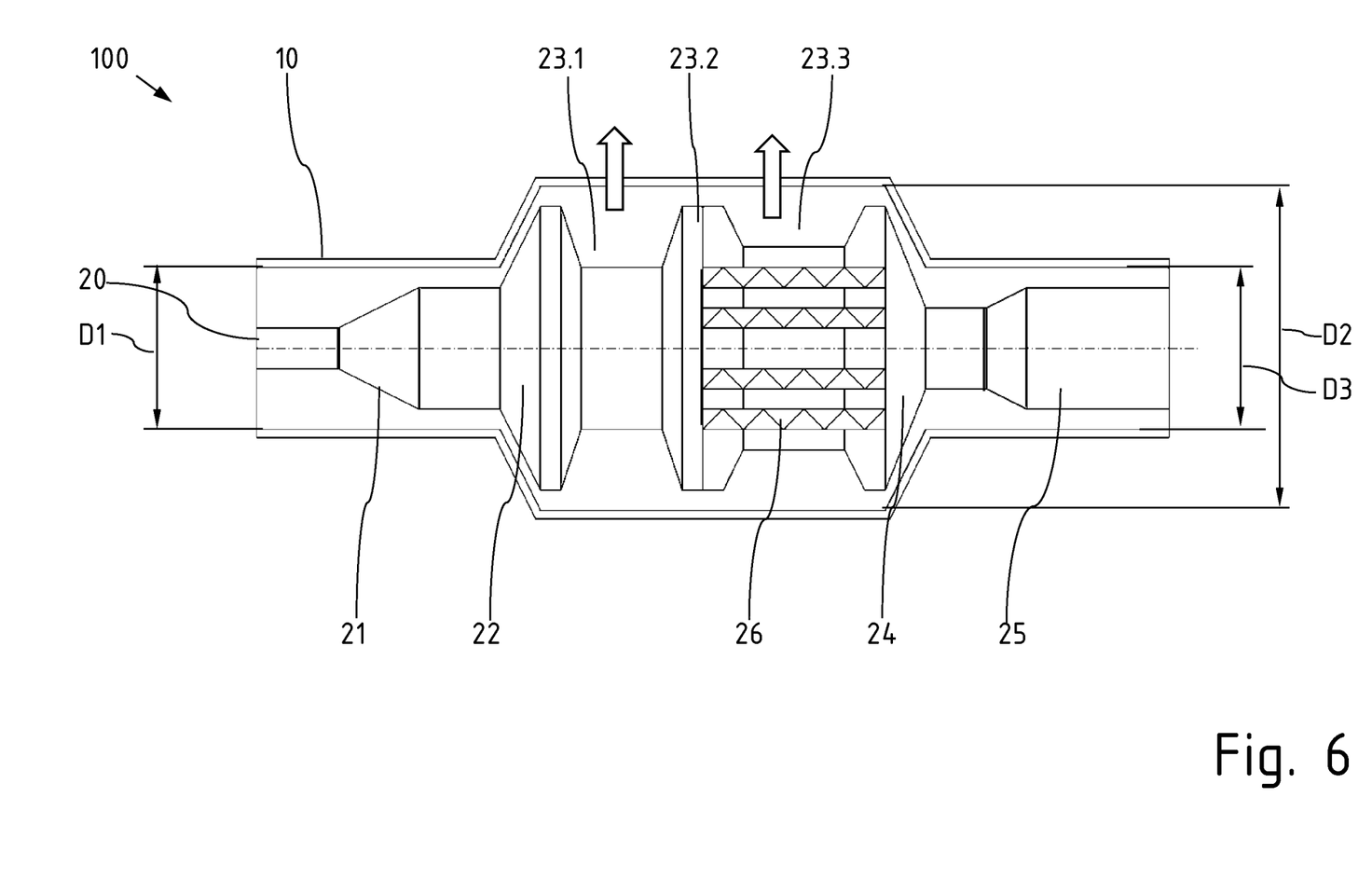
FIG. 6 is a schematic sectional view of the extruder according to FIGS. 1 to 5.

FIG. 6 is a schematic, highly exaggerated representation of the dimensional relationships on the extruder screw 20. The direction of flow is from left to right. Shown are the shaft core diameter and the outer diameter measured over the outer edges of the flights; the screw flights themselves are not shown in detail. Through this illustration, the variation of the flight depth between the shaft core and the inner wall of the housing 10 over the length of the extruder screw 20 becomes particularly clear.

At the end of the metering zone 21, the shaft core diameter increases for the first time. The outer diameter D1 remains constant. This reduces the channel depth. Compression of the conveyed melt occurs. In the transition zone 22, the flowable volume expands because the outside diameter increases to D2. This is compensated for by a further reduction in the passage depth in the conical transition zone 22. The aim is to convey the melt to the pre-degassing zone 23.1 in such a way that the flow channels formed are initially fully filled. The narrow gap there also increases the shear in the polymer melt.

At the beginning of the degassing zone 23, the corrugated core diameter is abruptly reduced significantly, while the outer diameter D2 of the flights remains constant. The suddenly increasing volume of the flow channel there can no longer be filled by the melt supplied. There is a sudden expansion of the melt, which was previously strongly sheared in the transition area 22 and thus also has been strongly heated. As a result of the pressure drop, the volatile substances contained in the melt dissolve particularly well during the expansion. The preceding heating by shear also contributes to this. The volatile substances, namely the majority of the load in the polymer melt, can thus already be extracted from the pre-degassing zone 23.1 via the extraction opening 15.1, as indicated by the block arrow.

This is followed by a flow channel constriction in the sealing and compression zone 23.2. On the one hand, this serves to collect the melt gas-free again and to convey it homogeneously. On the other hand, the flow channel should be filled without gaps over the entire circumference so that the flowing melt itself effects a gas seal and separates the degassing zones 23.1, 23.3 from each other in a gas-tight manner.

This is followed by renewed expansion in the melt, because in the post-degassing zone 23.3 the flow channel height increases abruptly due to a renewed reduction in the shaft core diameter with the same outer diameter D2 of the undrawn screw flights. The associated churning of the melt is further intensified by the rotating satellite screws 26 in this section. In the post-degassing zone 23.3, a high vacuum is applied to remove any remaining volatile impurities after passing through the pre-degassing zone 23.1. This achieves a high purity of the treated polymer and the desired increase in intrinsic viscosity.

Behind the post-degassing zone 23.3, the flow channel tapers towards the transition zone 24. In the transition zone 24, the webs and the corrugation core each have a different cone angle, which causes an enlargement of the flow channel. Between the transition zone 24 and the beginning of the discharge zone 25, a short constant channel depth is provided before the shaft core diameter increases again and the channel depth is consequently reduced while the outer diameter D3 of the extruder screw flights remains constant.

Figure 7:
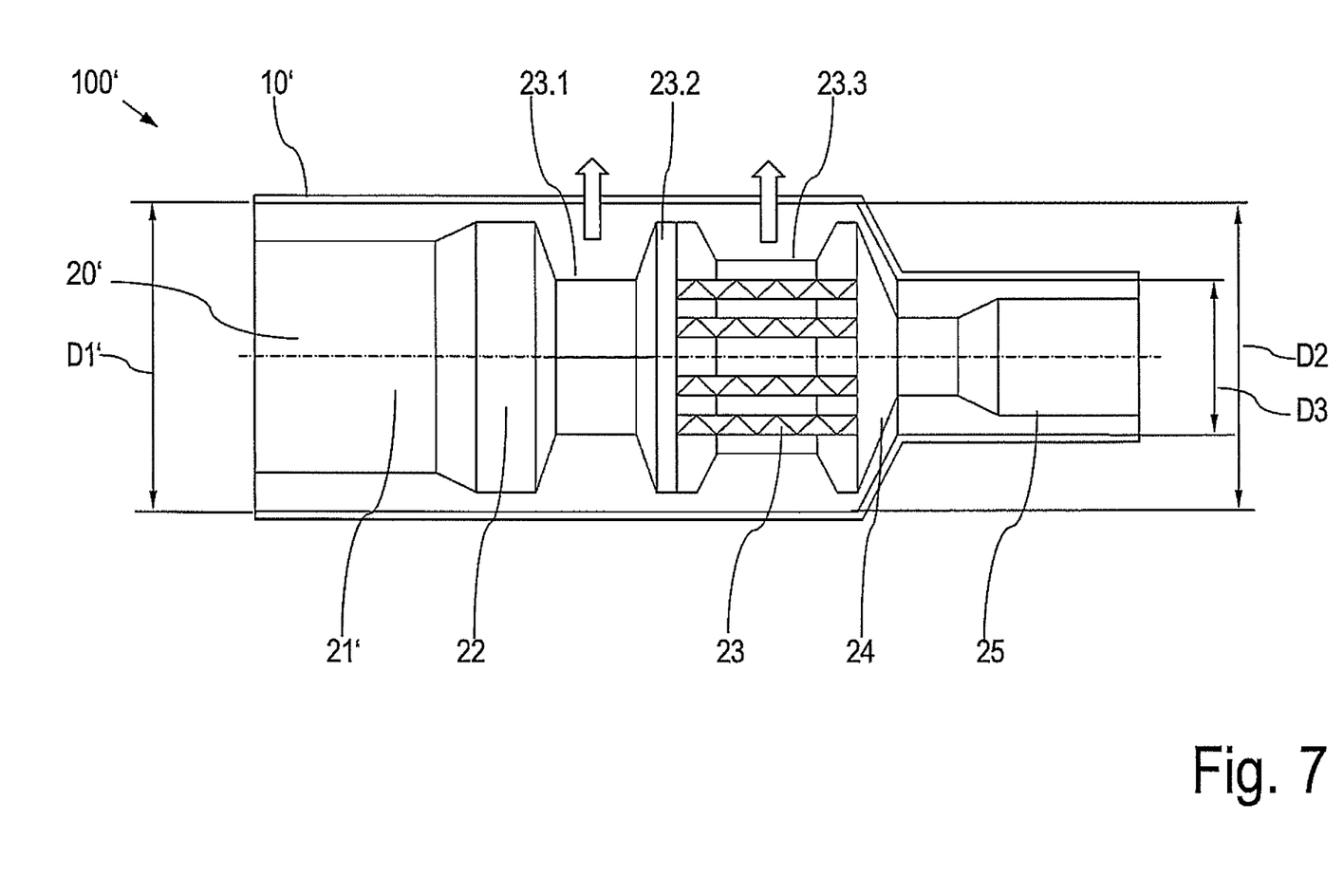
FIG. 7 is a schematic sectional view of an extruder according to a further embodiment.

FIG. 7 shows a schematic view similar to FIG. 6 of a further form of extruder 100'. This deviates from the previously described embodiment only with regard to the design of an extruder screw 20' in a feed zone 21'. The degassing zone 23 with the pre- and post-degassing zones 23.1, 23.3 and the intermediate sealing and compression zone 23.2, the transition zone 24 and the discharge zone 25 are designed in exactly the same way as in the first embodiment and thus the same reference characters are maintained for consistency.

The feed zone 21' has a diameter D1' which is the same size as the diameter D2 in the degassing zone 23 and is thus significantly larger than the diameter D3 in the discharge zone. The flow channel has a greater height in the feed zone 21' than in the transition zone 22. In this embodiment compression therefore also takes place in the transition zone 22 before a strong expansion occurs in the pre-degassing zone 23.1.

The differently formed feed zone 21' is advantageous, for example, if the polymer does not need to be drawn in there as a solid, melted and homogenized, but is already taken over in molten form from an upstream process.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An extruder for viscosity-increasing processing of meltable polymers, the extruder comprising:
   an extruder screw with helical extruder screw flights, an outer diameter of the extruder screw being subdivided into a diameter start region, a diameter center region and a diameter end region, the diameter center region having a larger outer diameter than at least one of the diameter start region or the diameter end region; and
   a housing with an inner housing bore, in which the extruder screw is rotatably arranged,
   wherein the extruder screw includes a first transition cone formed between the diameter start region and the diameter center region and a second transition cone formed between the diameter center region and the diameter end region,
   wherein at least two degassing zones are formed in the diameter center region of the extruder screw, each of the at least two degassing zones having at least one suction opening that extends from the inner housing bore to an outer side of the housing,
   wherein a plurality of rotationally driven satellite screws surround the extruder screw in a region of a first degassing zone of the at least two degassing zones, the satellite screws each rotate individually about a satellite axis and rotate together with the extruder screw,
   wherein a second degassing zone of the at least two degassing zones is formed upstream of the first degassing zone, and
   wherein a depth of screw channels formed between the extruder screw flights is greater in both of the first and second degassing zones than in at least one sealing and compression section that is formed between the first and second degassing zones.

2. The extruder according to claim 1, wherein a feed zone is formed for drawing in solid plastic particles and for melting and homogenization, and wherein a flow channel formed between the extruder screw and an inner wall of the inner housing bore tapers at an end of the feed zone immediately upstream of the first transition cone.

3. The extruder according to claim 2, wherein the flow channel formed between the extruder screw and the inner wall of the inner housing bore first widens and then tapers after the second transition cone in a discharge zone.

4. The extruder according to claim 3, wherein in a center zone of the flow channel, an inner diameter of the inner housing bore and an outer diameter of the extruder screw flights are larger than in the discharge zone.

5. The extruder according to claim 2, wherein in a center zone of the flow channel, an inner diameter of the inner housing bore and an outer diameter of the extruder screw flights are larger than in the feed zone.

6. The extruder according to claim 2, wherein in a center zone of the flow channel, an inner diameter of the inner housing bore and an outer diameter of the extruder screw flights are the same as in the feed zone.

7. The extruder according to claim 1, wherein the depth of the screw channels formed between the extruder screw flights in both the first and second degassing zones is greater by a factor of 3 to 10 than for the screw channels in the sealing and compression section formed between the first and second degassing zones.

* * * * *